United States Patent [19]
Behr et al.

[11] Patent Number: 5,293,281
[45] Date of Patent: * Mar. 8, 1994

[54] METHOD OF READING AND WRITING DATA TRANSITIONS ON SIDE-BY-SIDE TRACKS ON MAGNETIC MEDIA

[76] Inventors: Michael I. Behr, 395 S. Oakland, Pasadena, Calif. 91001; Frank C. Bumb, Jr., 395 Ano Nuevo Ave., #217, Sunnyvale, Calif. 94086

[*] Notice: The portion of the term of this patent subsequent to Jul. 21, 2009 has been disclaimed.

[21] Appl. No.: 865,621

[22] Filed: Apr. 8, 1992

Related U.S. Application Data

[60] Division of Ser. No. 485,060, Feb. 26, 1990, Pat. No. 5,132,861, which is a continuation-in-part of Ser. No. 415,718, Oct. 2, 1989, abandoned.

[51] Int. Cl.$^5$ .................. G11B 5/584; G11B 5/596
[52] U.S. Cl. ..................... 360/77.07; 360/77.12; 360/76
[58] Field of Search ............ 360/77.07, 76, 77.12

[56] References Cited

U.S. PATENT DOCUMENTS

| | | | |
|---|---|---|---|
| 3,404,392 | 10/1968 | Sordello | 360/77.07 X |
| 4,007,493 | 2/1977 | Behr et al. | 360/77.07 |
| 4,149,198 | 4/1979 | Behr et al. | 360/77.07 |
| 4,313,140 | 1/1982 | Keidl | 360/77.07 X |
| 4,314,290 | 2/1982 | Ragle | 360/77.07 X |
| 4,334,252 | 6/1982 | Toriu | 360/104 |
| 4,539,615 | 9/1985 | Arai et al. | 360/76 X |
| 4,975,791 | 12/1990 | Eggebeen | 360/77.01 |
| 5,055,951 | 10/1991 | Behr | 360/77.07 X |
| 5,132,861 | 7/1992 | Behr et al. | 360/77.07 X |

OTHER PUBLICATIONS

Takeo Eguchi, "The SMPTE D-1 Format and Possible Scanner Configurations", SMPTE Journal, Feb. 1987, pp. 166-170.

N. Kaku et al., "Mechanical Considerations in the Design of a Composite Digital VTR", SMPTE Journal, Aug. 1989, pp. 568-574.

Primary Examiner—David L. Robertson
Attorney, Agent, or Firm—William W. Haefliger

[57] ABSTRACT

A track means defined by magnetic recording media on a substrate, the media along the track means having two levels, one for recording of data, and the other for recording of servo information, wherein recorded magnetic transitions at the second level define the servo information, the transitions arrayed along the track means as groups of converging lines which extend in crosswise or spanwise relation to multiple tracks. The data is recorded without any wasted magnetic space between tracks (zero guardband) using alternating angles (azimuthal) of magnetic orientation so that they do not interfere with each other when read. The read head cores or gaps may be "oriented" to read recorded data transitions extending at different angles relative to track length direction.

3 Claims, 6 Drawing Sheets

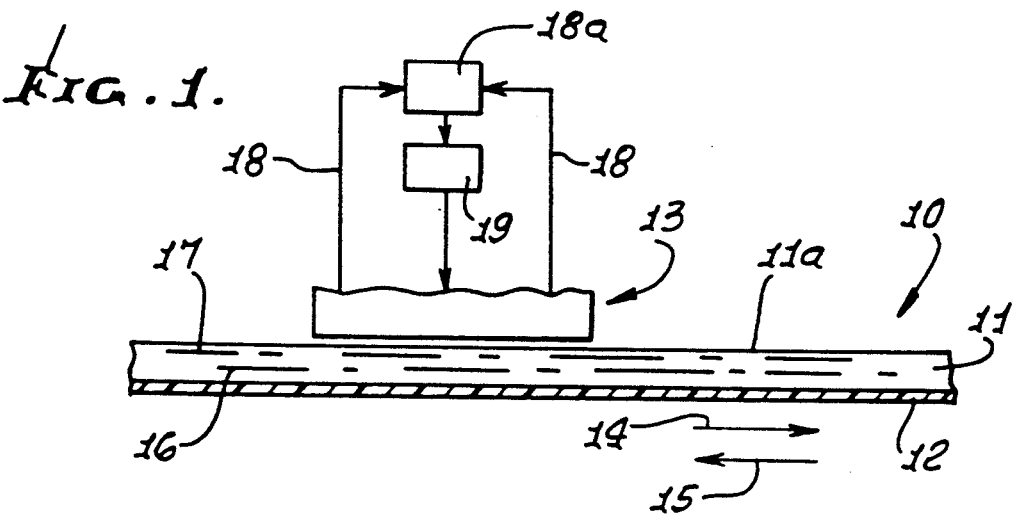
Fig. 1.
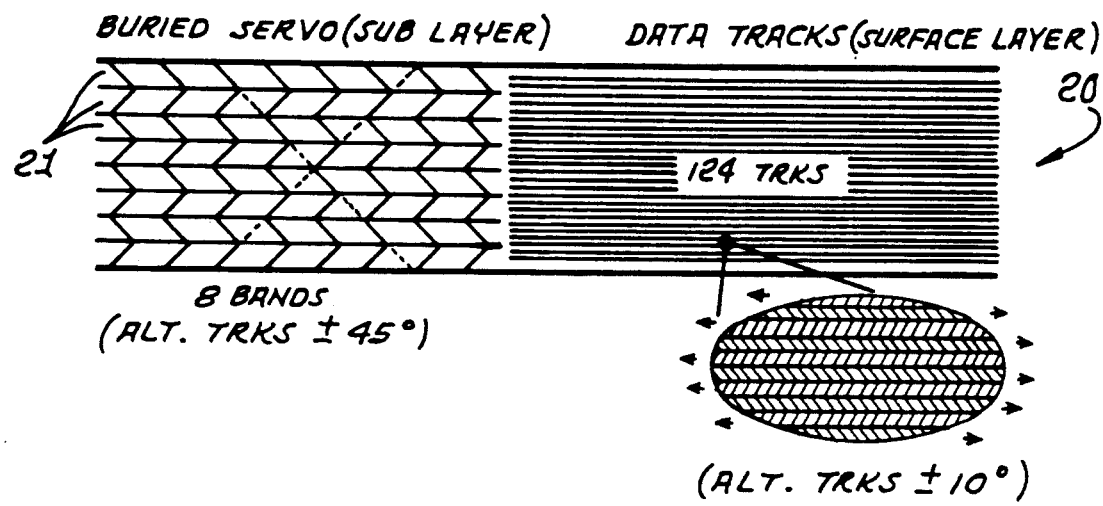
Fig. 2. TAPE FORMAT
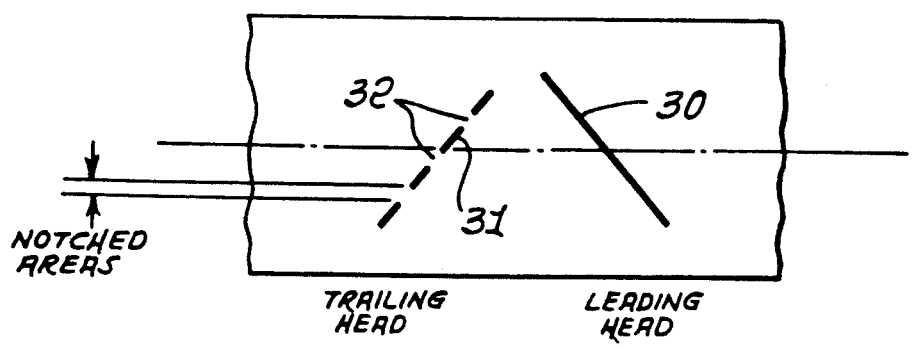
Fig. 3.
SERVO HEAD (FACE)

TWO CHANNEL CHEVRON PATTERN
(TRACKS WRITTEN TWO AT A TIME)

TWO CHANNEL AZIMUTH HEAD ARRANGEMENT

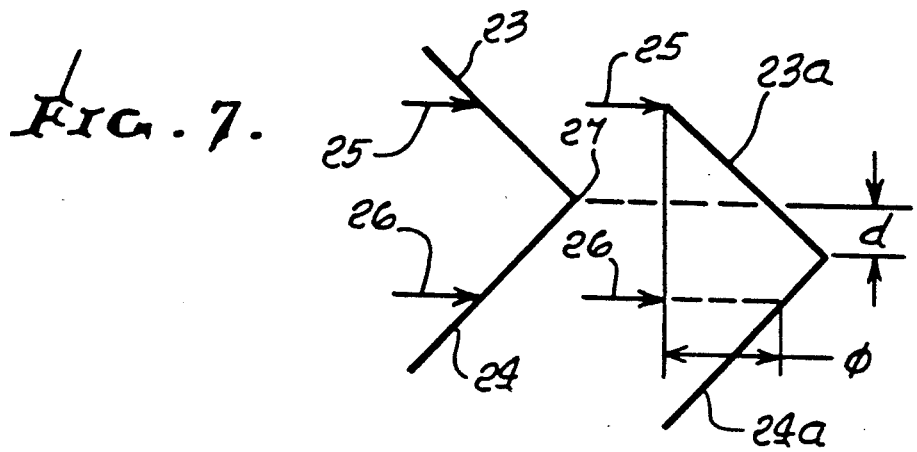
FIG. 7.
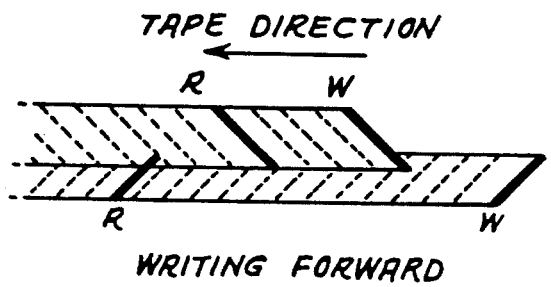
FIG. 8.
WRITING FORWARD
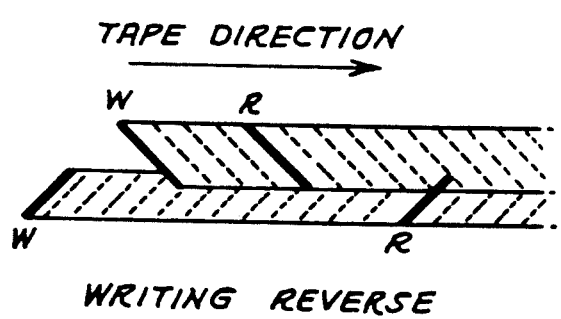
FIG. 9.
WRITING REVERSE
FIG. 10.
READING TWO CHEVRON PATTERN
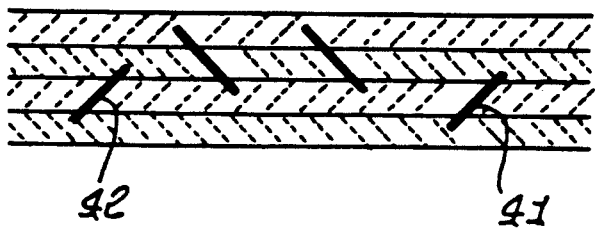

READING TWO CHEVRON PATTERN
(EVERY OTHER TRK AT 0° AZIMUTH)

READING ONE NORMAL (0° AZIMUTH) DATA TRACK

METHOD OF READING AND WRITING DATA TRANSITIONS ON SIDE-BY-SIDE TRACKS ON MAGNETIC MEDIA

This is a division of application Ser. No. 485,060, filed Feb. 26, 1990, now U.S. Pat. No. 5,132,861, which is a continuation-in-part of Ser. No. 415,728, filed Oct. 2, 1989, now abandoned.

BACKGROUND OF THE INVENTION

This invention generally relates to increasing the data storage capacity of systems using magnetic media by increasing the ability to record and reproduce more tracks in the same area of recording media; i.e., the recording and reproducing of data tracks at very high track densities.

The invention specifically relates to the generation of reference location data (indicia) on or in magnetic recording media by the generation of configurations of such reference data at buried locations in such media, to enable accurate lateral positioning control of a read and/or write head relative to which the media travels longitudinally, to the extent that more information data can then be provided (magnetically recorded) on the media.

There has been a consistent increase in data storage densities of other devices using magnetic media such as floppy discs and Winchester discs. The density of data storage on Winchester disc drives and helical scan tape drives has increased much faster than areal densities of conventional longitudinal recorders, i.e., tape.

The density of data storage capability on longitudinal tape recorders and floppy discs has increased more slowly than on Winchester and helical scan devices, particularly as to increasing the number of data tracks per inch recorded/reproduced, i.e., the lateral storage density. Some reasons for this are: Winchesters use various servo locating reference modalities to accurately locate the data record/reproduce (or write/read) head over the track when it is recorded or reproduced. Helical scan recorders guide tape carefully on "fences" or leads around a cylindrical drum, and use servo schemes to position the head over the relocated data track, when reading data.

Longitudinal recorders employing one quarter inch data cartridge drives have generally used less accurate head reference or locating schemes. They have depended on holding "open loop" tolerance accumulations to tape, guides and head track variations to position the write head approximately on or at a required physical location. In the read mode, most conventional tape drives use the same approach of "open loop" positioning (no servo feedback) to position the read head. This requires that space be left between the tracks to allow for these tolerances. These are called "guardbands". Some drives have used servo approaches as outlined below. However, because of the relatively coarse or approximate head positioning for writing, azimuthal recording is not being used because the tolerance accumulations would not, in practice, allow "zero guardband recording", i.e., the tolerance variations are too large.

As will be explained, the present invention directly addresses the problem of accurate track location relative to the write/read head for the initial write or recordation of data and the subsequent reproduction of data. The invention provides location reference information by (a) an approach that does not use media surface area to record reference data, and (b) a technique enabling unusually precise head location relative to a data track. The use of so-called "buried servos" (i.e., reference data locations deep in the media) was proposed some time ago, i.e., as in IBM Tech. Disclosure Bulletins Vol. 23, #7A, Dec. 1980 and Vol. 23 July 1980. Such buried servos were difficult or impractical to implement in disc drives. One buried servo scheme used a combination of recording separate signal frequencies in separate sub-data media areas and then comparing amplitudes of respective frequencies to determine head position. This amplitude sensing and comparison approach is less accurate, and more difficult to implement than the signal phase technique disclosed herein.

SUMMARY OF THE INVENTION

It is a principal object of the invention to overcome the restrictions and limitations on track density of previous approaches, and to provide means to record a precisely located series or matrix of superimposed, orthogonal successive magnetic transitions. The resultant orthogonal pattern recorded at a buried level in the media is characterized by relatively long wavelength. Convergent azimuth patterns other than orthogonal can be used.

Basically, the invention is embodied in track means having two levels, one for recording of data, and the other for recording of servo information, and employs recorded magnetic transitions at the second level defining the servo information, the transitions arrayed along the track means as groups of converging intersecting lines which extend in superimposed relation to multiple tracks, i.e., crosswise or spanwise of the tracks.

As will appear, the transitions are typically "buried" at a level closer to the substrate; and the groups of transitions define sequences or transitions including a first sequence of parallel transitions extending at one angle, and a second sequence of parallel transitions extending at a second angle, the transitions of each sequence extending in superimposed relation to multiple tracks.

It is another object to provide a means to record this servo information on multiple tracks on magnetic flexible tape in which case the buried servo transitions are straight. If the groups of transitions are on a disc, they may be spiral shaped.

Further objects include the provision, in such buried servo systems of 1.1. means for providing continuous high precision tracking input to tracking servo for recording and for playback;

1.2 means for high precision location of tracks at instant of recording such data tracks;

1.3 means for minimizing the effects of track-to-track crosstalk resulting from head off-track wandering, head dimensional tolerances and environment influences (drift, due to temperature and humidity);

1.4 means for providing multiple parallel tracks using azimuthal recording in order to speed up transfer of information to and from the tape;

1.5 means for permitting substantial storage enhancement of existing tape storage hardware and retaining majority of essential components;

1.6 means to generate positioning servo data source readily and rapidly without need for complicated and expensive processes and instrumentation.

A further object is to provide magnetic head means having data read/write flux gaps for writing and reading data on parallel tracks and wherein a first two of the data flux gaps extend at an obtuse angle $\beta$ relative to the leading and tracking direction, and a second two more of the data flux gaps extend normal to the leading and trailing direction. In this regard, the second two flux gaps are spaced longitudinally along the direction, and the first two flux gaps are spaced between the second two flux gaps. Further, the "rotated" gap configuration allows reading of data on "alternate azimuth" data tracks, as well as on conventional linear type conventional data tracks.

A further object is to provide servo and data heads providing unusual advantages in construction and modes of operation, and affording unique results.

These and other objects and advantages of the invention, as well as the details of an illustrative embodiment, will be more fully understood from the following specification and drawings, in which:

DRAWING DESCRIPTION

FIG. 1 is a tape/head schematic diagram;

FIG. 2 is a schematic showing data tracks as related to buried servo transition bands;

FIG. 3 is a view of a servo record head face (surface in contact with magnetic tape);

FIG. 7 is a schematic showing phase error signal generation;

FIGS. 8 and 9 show forward and reverse data writing modes;

FIG. 10 shows head location when reading the data pattern;

DETAILED DESCRIPTION

Figure 4:
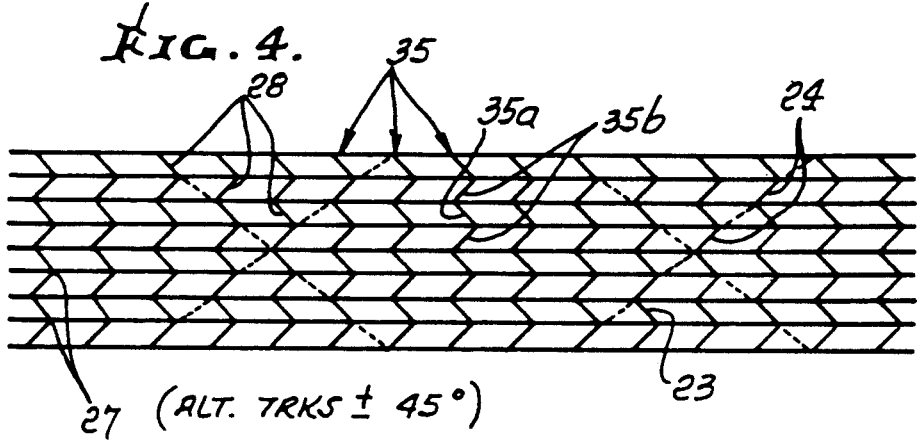
FIG. 4 is an enlarged view showing one possible embodiment of servo transition bands.

FIG. 1 shows magnetic media such as tape 10 which includes magnetic layer 11 fixed on a flexible plastic substrate 12. The tape is passed or driven relatively past a magnetic read/write head means 13, longitudinally forwardly (see arrow 14) or reversely (see arrow 15). Servo information (magnetic transitions) is recorded at a "buried" level 16 in media 11, and data is recorded at a level 17 closer to the media surface 11a. Thus, level 16 is closer to substrate 12 than level 17. Servo information is read by the head and transmitted at 18 to a processor 18a, which in turn controls an actuator 19 to precisely locate the head laterally, relative to multiple data tracks 20 extending longitudinally in or on the media at level 17. See FIG. 2 indicating 124 such tracks. Eight "buried" servo information carrying bands are also indicated at 21 in FIG. 2, each such band laterally spanning (at level 16) multiple data tracks (at level 17). Other numbers of servo tracks and data tracks are possible. These numbers are used only as an example.

FIG. 7 schematically shows two orthogonal servo transitions 23 and 24 recorded in the tape that pass the head "sensors" (flux gaps) 25 and 26, and read, with the head aligned or centered relative to the head; and two subsequent transitions 23a and 24a recorded in the tape media that pass the sensors 25 and 26, the tape having become misaligned laterally by amount "d" when 23a and 24a are read. This causes a reading timewise phase error $\phi$ due to reading of 23a by 25, and later reading of 24a by 26. This phase error $\phi$ generates an error signal that is transmitted to processor 18, as described, to control the head so that it follows the tape laterally and precisely aligns with the tape for aligning the data read/write magnetic (flux) gaps with the data track being read or written.

SERVO WRITING ON TAPE

Servo writing can be done with two heads writing simultaneously on one pass over the tape, one head to write transitions 23, and the other to write transitions 24. See FIGS. 3, 4 and 7. Both heads are wider than the tape, and each has a diagonal flux gap which spans the full width of the tape. The gaps or cores are oriented at the desired positive and negative angles for the servo pattern (i.e., $\pm 45°$). The servo pattern is written at a current which saturates the full depth of the oxide coating. The wavelength of the servo signal is a low frequency compared to the data frequencies in order to minimize servo to data channel cross-talk and vice versa.

The heads are located in leading and trailing configurations, and the leading head is a normal head with a continuous gap 30 over its length. See FIG. 3. The trailing head is identical to the leading head, except that its gap 31 is oriented at the opposite azimuth angle, and has notches 32 machined into its face in the gap area (see FIG. 3). The head magnetic core material that is removed in the notching operation is replaced with a nonmagnetic material, such as a ceramic. The width and tolerance on each notch is not critical, and has no effect on the accuracy of the servo information.

With this configuration, the leading head writes transition signal at one azimuth angle over the full width, and the trailing head overwrites this signal with new bands, or strips, of transition signal at the opposite azimuth angle. The resulting composite signal consists of lateral servo bands 35 with zig-zag segments 35a and 35b written at alternating azimuth angles with the timing (the gap line) of all the bands with the same azimuth angle precisely aligned and synchronized (see FIG. 4).

The location of the servo signal laterally on the tape is not critical. Fixed heads with normal guiding tolerances provide adequate accuracy. Drives using this technique of track following may determine a desired distance from any of the coincident points 27 in the pattern when starting to write the first data track on the tape, and then use the servo information to maintain this position and locate all remaining tracks.

In the read mode, the drive locates a reference burst (like the zero track burst in quarter inch cartridge committee formats) to determine the relationship between the data tracks and the servo signal. Once this calibration procedure is completed for the starting track, the drive again uses the servo information to maintain this position and locate all remaining data tracks. This self calibrating scheme eliminates the many dimensional difference and tolerance problems between the writing and reading heads, and allows for different servo head and data track configurations. The diagonal dotted lines in FIG. 4 indicate that the transitions are written by the same head, in order to maintain alignment. Alternately, the servo pattern can be written by a narrower head (i.e., the head in a drive) in several passes, progressing across the width of the tape, electronically synchronized.

TWO DATA CHANNEL AZIMUTHAL (CHEVRON) FORMAT

Figure 5:
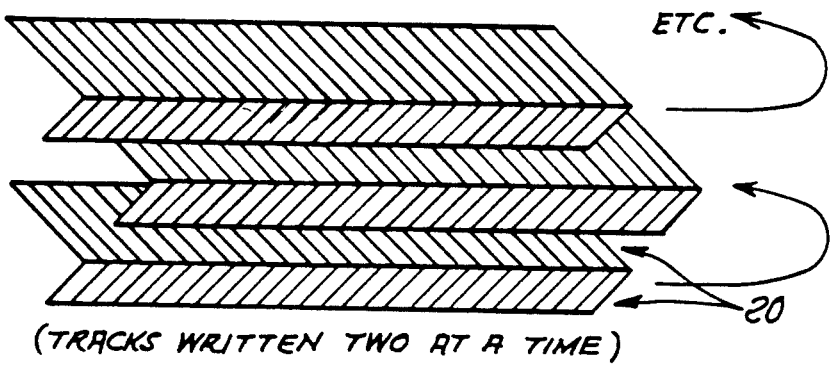
FIG. 5 is a two channel data track write pattern.

The data tracks 20 may be written two at a time, side-by-side, and back and forth as the tape is transported forwardly and reversely. By "painting" the tracks at the proper pitch, the desired track width is achieved for all tracks, except for the last one recorded. Writing two tracks at a time reduces time required to transfer a given amount of data by a factor of two. See FIG. 5 for a two-track scheme, and note overlap.

Figure 6:
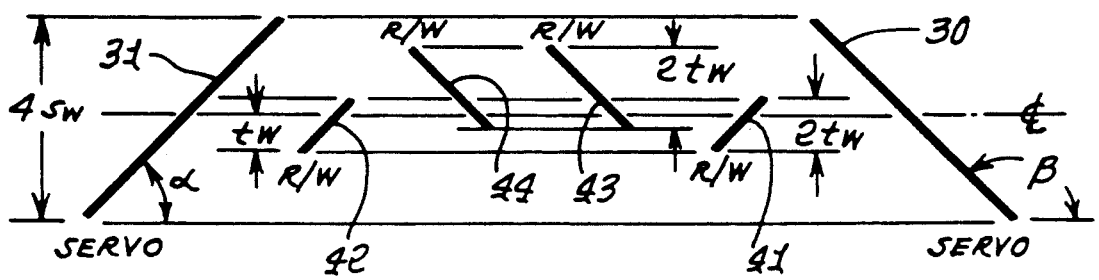
FIG. 6 is a two channel (chevron) azimuthal head configuration.

Referring to FIG. 6, the head configuration is a six-core head, with four read or write cores 41–44 and two servo cores 30 and 31. They are arranged as shown, with gap 31 extending at angle $\alpha$ and gap 30 at angle $\beta$, where $\alpha = 180° - \beta$. The R/W cores are double the final data track width. They are arranged so that each set of heads overlap the centerline reference by 0.5 data track widths. The servo cores are centered on the reference centerline, and they are four times (or other even multiples of) the servo track widths.

When writing the data, the tracks are trimmed as shown in FIGS. 8 and 9, in the forward and reverse directions to their final width.

When reading the data tracks, the heads are offset ½ track width so that cores of both heads 41 and 42 overlap both edges of the track, as do cores 43 and 44. The overlap for this arrangement is ¼ track on either side of both heads. This head is easier to produce (six cores) than other two channel bi-directional read after write heads (seven or more cores). FIG. 10 shows the position of the read heads when reading data.

HEAD CONSTRUCTION

Figure 13:
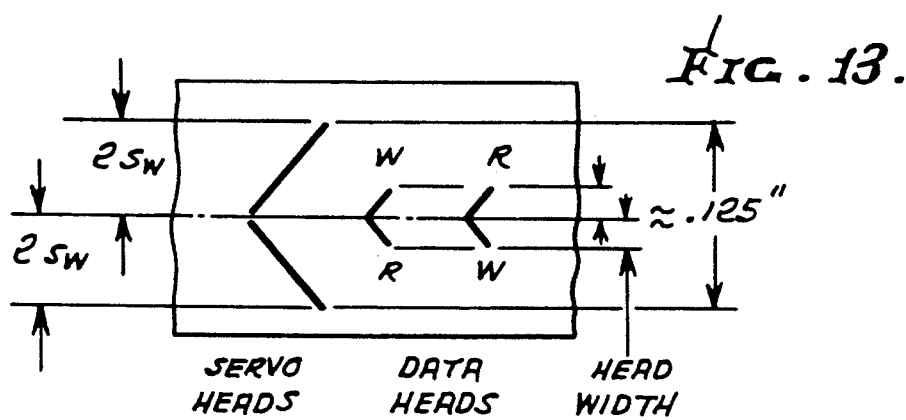
FIGS. 13 and 14 are views showing alternative data and servo core (gap) in configurations in heads.
Figure 14:
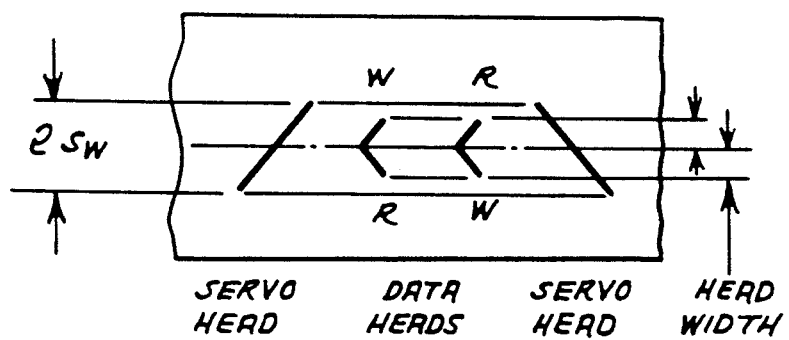

FIGS. 13 and 14 show alternative servo and data head gap (core) arrangements, as labeled, and with relative width as seen.

Figure 15:
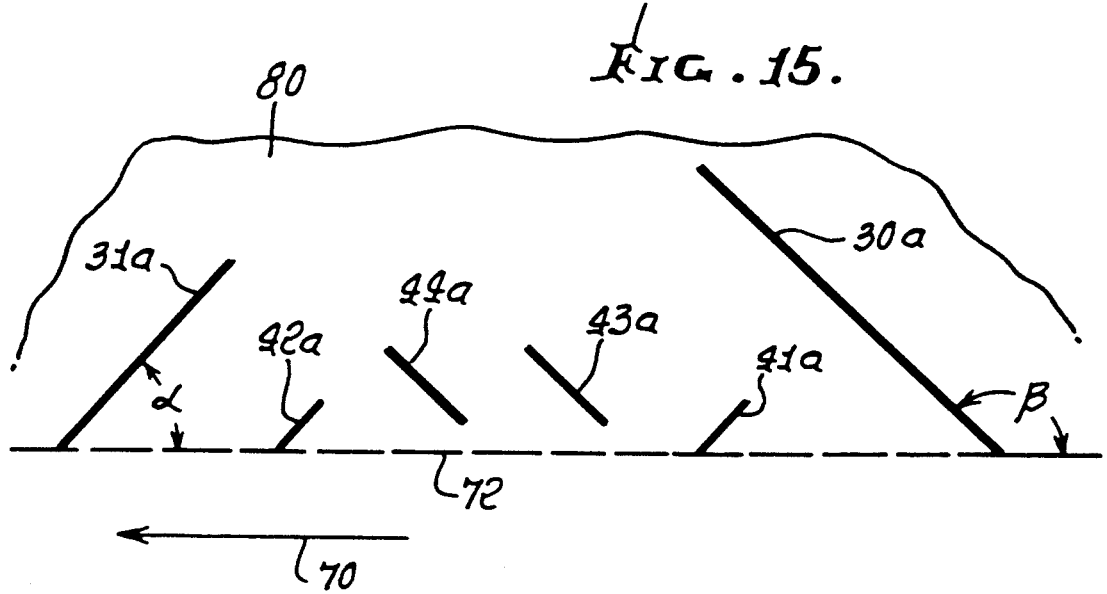
FIG. 15 is a view like FIG. 6 showing a modification.

In FIG. 15, the modified head gaps 30a, 31a, 41a–44a are arranged as shown, with lengths and azimuth angles as in FIG. 6, gap 30a serving an erase function to erase previously recorded data. Tape moves in direction 70. Gap 31c operates as a servo. Gaps 41a–44a are shifted toward longitudinal edge 72, as shown. Head structure 80 supports the gaps.

Figure 16:
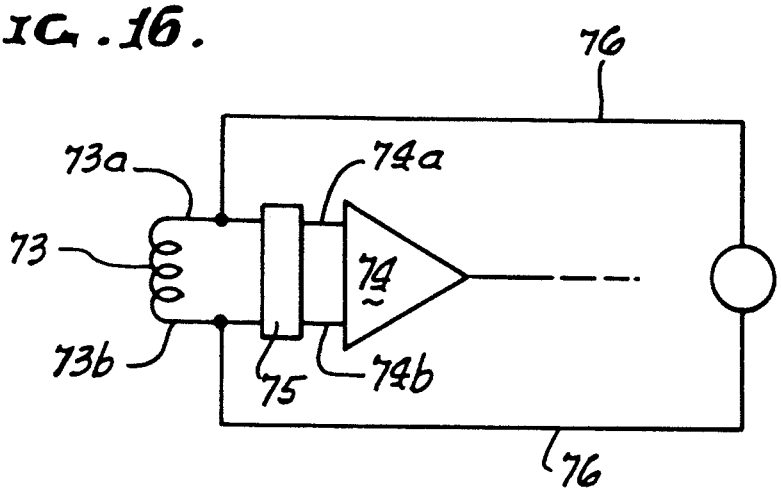
FIG. 16 is a circuit diagram.

FIG. 16 shows associated circuitry, including head coil 73, and servo drive amplifier 74 with inputs 74a and 74b connected via filter 75, with coil terminals 73a and 73b. High frequency erase signal is transmitted at 76 to core 30a.

In FIG. 15, gap 30a extends at angle $\beta$, and gap 31a extends at angle $\alpha$, where $\alpha \triangleq 180° - \beta$.

ADDITIONAL DESCRIPTION

This invention utilizes two proven recording technologies and combines them to provide benefits that cannot be achieved with either technology alone, nor with any other known technology. Furthermore, this invention provides solutions for the practical problems that have prevented the combination of these technologies in the past, in linear recording.

These solutions include:

A head design with complexity and tolerances comparable to today's commonly used heads but provides significantly more data capacity.

A simple, single pass mode for servo writing the tape with a "generic" servo pattern that does not dictate the number of tracks, the data density, the format, or even the recording method, and yet provides the precision necessary for high track densities. This servo pattern can be used for several generations of products.

A multiple track, zero guardband, read/write format necessary to reduce data transfer times at gigabyte capacities, and which does not impose difficult tolerances on the head.

While the discussion has proceeded with reference to magnetic tape, the invention is also applicable to other magnetic media, such as magnetic discs (floppies, etc.).

The servo transitions that may extend upward to level 17 do not interfere with read data because of their low frequency and azimuthal misalignment with the data heads. See FIG. 1.

A representative specification, buried servo, zero guardband format, is as follows:

1) Storage Capacity—5.9 GB, formatted.
2) Servo—16 bands, servo pitch Sw=0.0156" width, buried, orthogonal pattern recorded at ±45° on 0.25" magnetic tape.
3) Tape Speed—120 IPS.
4) Servo Density—1000 FCI.
5) Data Density—38,750 FTPI or 51,667 BPI.
6) Encoding Scheme—RLL 1,7.
7) Number of tracks—124, alternate azimuth, zero guardband, recorded at ±10°, or 20° and 0°.
8) Data Channels—2.
9) Head Lateral Track Width—0.0036 IN.
10) Track Pitch (Recorded Track Width)—0.0019 IN.
11) Dump Time—77 MIN. (for signal channel).
12) Data Rate—775 kilobytes/sec.
13) Head Type—2 servo and 4 R/W heads (see FIG. 6 for possible configurations).
14) Tape Type—900 Oe, 750 FT., full size data cartridge. Will also work with 215 FT, DC-2000 900 Oe mini cartridges.
15) Positioner Resolution—0.0002 IN maximum.

Figure 17:
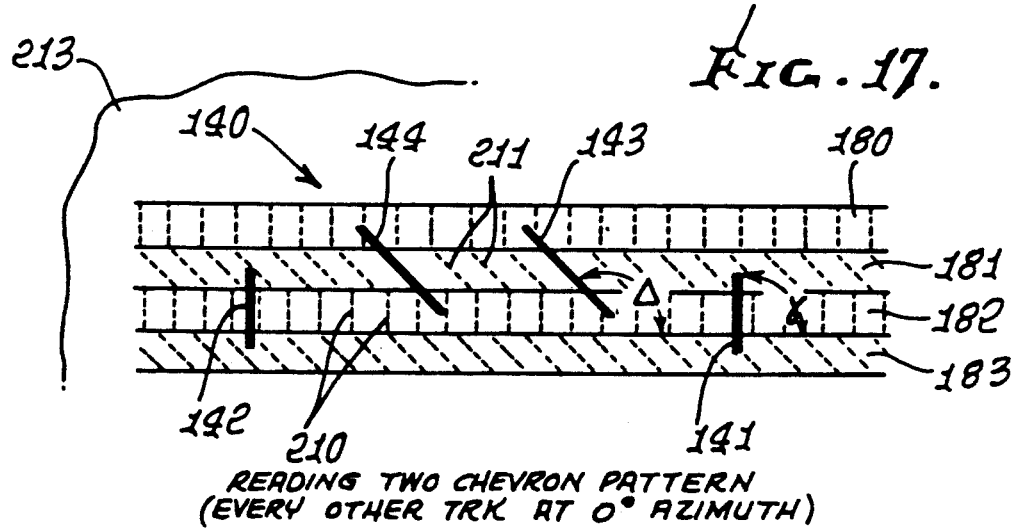
FIG. 17 is a modified head configuration reading alternate azimuth data.
Figure 18:
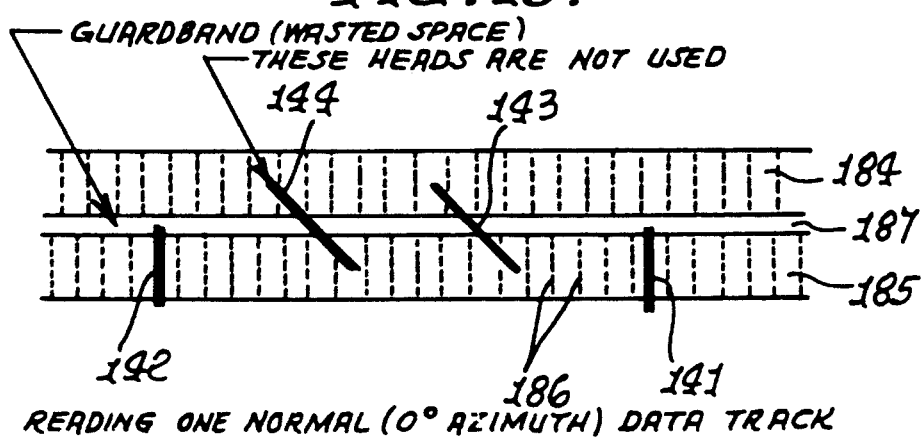
FIG. 18 is a view of the FIG. 17 head reading conventional linear spaced data.

Referring to FIGS. 17 and 18, the head configuration 140 is a four core head, i.e., four read/write cores 141–144. Thus, it is similar to FIG. 10 and also to FIG. 6 except that servo cores shown in FIG. 6 are omitted. (Such servo cores may be used in conjunction with servo transitions as seen in FIG. 4.)

In FIGS. 17 and 18, data read/write cores 141 and 142 are parallel and extend normal $\alpha = 90°$ to the length direction of the data tracks shown (tracks 180–181); and data read/write cores or gaps 143 and 144 extend at angles $\Delta$ relative to such data track length directions. $\Delta$ is 135° for example. If servo reference transitions are used at angles $\alpha$ and $\beta$, as per above, then $\Delta$ should differ from $\alpha$ and $\beta$, for example be 120°. The length of cores 143 and 144 is about three data track widths; and the length of cores 141 and 142 is two data track widths. (Note that the projected length of each of 143 and 144 normal to tape direction is two-track width.)

The "rotation" of the heads 141 and 142 still retains the desired difference in azimuth between the heads that provides the benefits of alternate azimuth recording, and yet leaves one set of head cores available to read and write linear, perpendicular azimuth formats without the need to add additional head cores. Heads 141 and 142 read magnetic data transitions 210, and heads 143 and 144 align with and read transitions 211. Heads 141 and 142 cannot read transitions 211; and heads 142 and 143 cannot read transitions 210. All heads are on a single carrier 213.

In reading the "alternate azimuth data track pattern" of FIG. 17 (data on alternate tracks 180 and 182 has conventional linear format, and data on alternate tracks 181 and 183 has angled azimuthal configuration, typically where Δ=135°), the cores 141 and 142 laterally bridge the entire width of track 182, reading data thereon, and also extend partly over tracks 181 and 183, but not reading data thereon since these data magnetic transitions are angled relative to cores 141 and 142. The cores 143 and 144 align azimuthally with angled data transitions on track 181, as shown, reading data thereon, and they also extend partly over tracks 180 and 182, but not reading data on the latter since the data transitions on 180 and 182 are not aligned angularly with cores 143 and 144. Therefore, the tracks may extend directly adjacent one another, laterally, as shown, and no guardband is needed. The core lengths are typically:

length of each core 141 and 142=approximately two track widths projected length normal to the direction of each core 143 and 144=approximately three track widths.

In FIG. 18, the cores 141–144 are the same as in FIG. 17. Data tracks 184 and 185 are conventional, with linear spaced transitions 186 extending normal to the longitudinal length directions of the tracks (i.e., such transitions have "zero azimuth"). A narrow guardband 187 is employed between the tracks 184 and 185, as is conventional. Cores 141 and 142 can read those transitions on a track as at 185, since those cores align with those transitions. Cores 143 and 144 are not then used. Cores 141 and 142 may be regarded as effectively "rotated" relative to corresponding cores 41 and 42 in FIG. 10. Note that cores 141 and 142 bridge the entire width of track 185.

Cores or flux gaps 141 and 142 may be regarded as extending at different azimuth angles relative to cores 143 and 144 and vice versa.

The drawings may be considered as examples of applicability to linear magnetic tape, or to magnetic discs, with spiral tracks.

Figure 11:
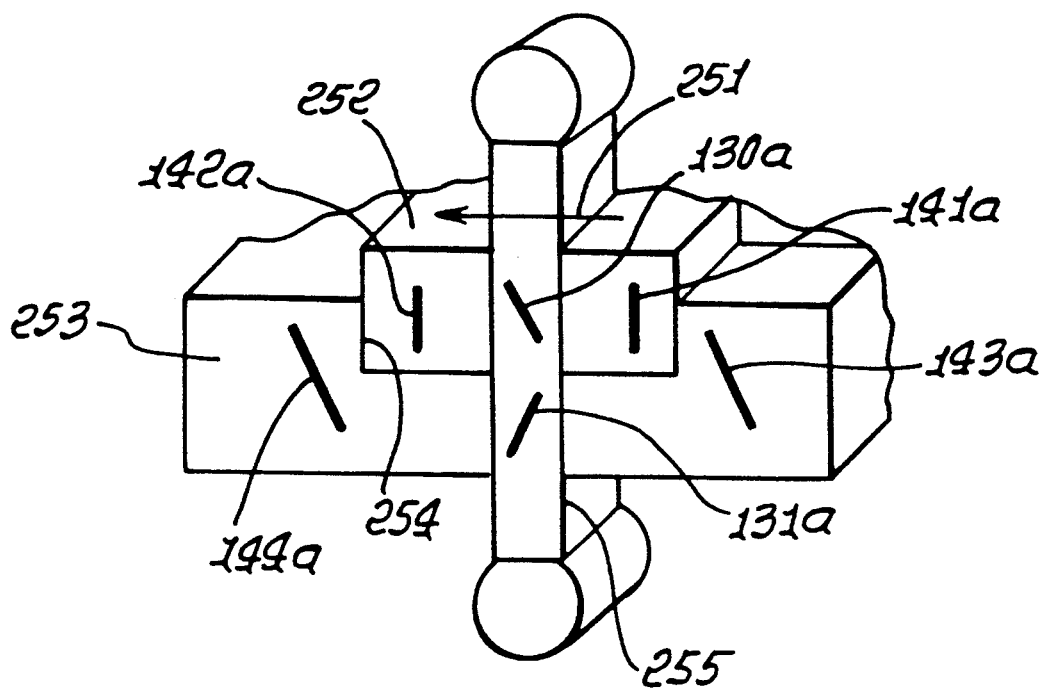
FIG. 11 is a view of a modified head.

In FIG. 11, a composite head 250 has data read/write core or flux gap elements 141a, 142a, 143a, and 144a that respectively correspond to elements 141–144 of FIGS. 17 and 18. Elements 141a and 142a are laterally offset (direction 251) relative to elements 143a and 144a, the same as in FIGS. 17 and 18, and relative to the tape tracks. Core elements 141a and 142a are carried by head block part 252 which interfits with head block part 253, for example, and at the notching indicated at 254.

Servo flux gaps 130a and 131a correspond to those shown at 30a and 31a in FIG. 15; however, gaps 130a and 131a are now laterally offset from one another, and located between 141a and 142a, and between 143a and 144a, as indicated. They may be carved by a head block part 255 interfitting 252 and 253, as shown.

By placing the two identical servo gaps in FIG. 11 in laterally offset relation, the accuracy of lateral head position correction relative to the tape track (being read or written upon) is enhanced, as contrasted with the servo gap arrangement seen in FIG. 15.

Figure 12:
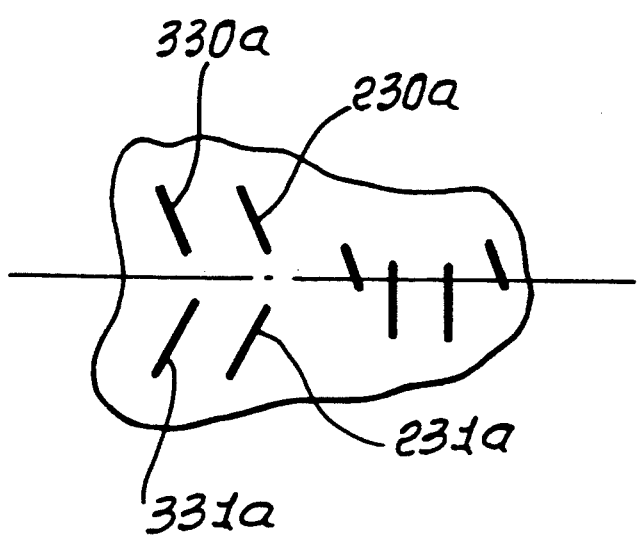
FIG. 12 is a view of yet another modified head.

FIG. 12 shows, schematically, an arrangement like that of FIG. 11 but modified in that two sets of servo cores are provided, i.e., set 230a and 231a, and 330a and 331a. The cores 230a and 231a are directly laterally spaced apart, as are the cores 330a and 331a; and the first set (230a and 231a) is longitudinally offset from, but close to, the second set (330a and 331a). The corresponding detected time phase differences developing, in case of yaw or lateral misalignment of the tape relative to the head, allow lateral offset (misalignment) of the tape to be separated from yaw offset. This provides a means for correcting for both lateral offset and yaw offset at the data read/write cores or heads.

From the foregoing, it will be understood that the combination provides a method for recording data on track means defined by magnetic recording media on a substrate, the media along the track means having two levels, including a first level for recording of data, and a second level for recording of servo information in the form of transitions arrayed along the track means as groups of converging lines which extend in superimposed relation to multiple tracks. The method includes the steps:

a) recording data as magnetic transitions spaced along the track means at the first level, such recording including operating a record head, b) and operating servo means for sensing such converging servo lines, and to control lateral movement of the record head relative to the track means, in response to such sensing.

In this regard, the operating step typically includes providing servo magnetic core means on the record head; and the data magnetic transitions are advantageously recorded azimuthally angularly relative to the track means length direction. Highly accurate recording of data is then made possible without guard bands.

Further, a data read magnetic core is typically provided on the head in travel direction alignment with a data record magnetic core on the head, and the cores may be operated to record data, and immediately thereafter to read data. Such write/read mode of operation, using azimuthal cores and transitions, is useful for example in comparing data written with data read for accuracy.

I claim:

1. In the method of writing and reading data, by operation of magnetic head means, on side-by-side tracks defined by magnetic recording media on a substrate, said tracks having lengths and widths, said magnetic head means having lengthwise elongated magnetic flux gaps, the steps that include:

a) magnetically writing data magnetic transitions on the tracks, and to extend at angles relative to the length directions of the tracks, at least one angle being acute relative to said length direction, b) and immediately thereafter magnetically reading said transitions, c) the method including operating said magnetic head means to cause the data transitions, as recorded, to have lengths as measured along the direction of gap lengthwise elongation greater than the widths of said side-by-side tracks, and operating the head means to perform read after write on two or more adjacent data tracks simultaneously, in either direction of media travel relative to and along said length directions of the tracks, d) there being servo bands buried in the media beneath said data tracks, each servo band underlying multiple of said data tracks, e) and operating said magnetic head means to write servo transitions in said buried servo bands, servo transitions extending at angles other than normal to said tracks and bands, individual servo transitions bridging multiple data tracks.

2. The method of claim 1 wherein the magnetic head means includes read/write magnetic cores which are azimuthally angled relative to the track means length direction, and orienting and operating said magnetic cores to carry out said a), b) and c) steps of claim 1.

3. In the method of writing and reading data, by operation of magnetic head means, on side-by-side tracks defined by magnetic recording media on a substrate, said tracks having lengths and widths, said said magnetic head means having lengthwise elongated magnetic flux gaps, the steps that include:

a) magnetically writing data magnetic transitions on the tracks, and to extend at angles relative to the length directions of the tracks, at least one angle being acute relative to said length direction, b) and immediately thereafter magnetically reading said transitions, c) the method including operating said magnetic head means to cause the data transitions, as recorded, to have lengths as measured along the direction of gap lengthwise elongation greater than the widths of said side-by-side tracks, and operating the head means to perform read after write on two or more adjacent data tracks simultaneously, in either direction of media travel relative to and along said length directions of the tracks, d) there being servo bands buried in the media beneath said data tracks, each servo band underlying multiple of said data tracks, e) the magnetic head means including read/write magnetic cores which are azimuthally angled relative to the track means length direction, and orienting and operating said magnetic cores to carry out said a), b) and c) steps, f) and including a guidance system, the magnetic cores including a read core, and operating said system to laterally guide said head means to maintain the read core in alignment with said data transitions extending at said acute angle on the track means.

* * * * *